UNITED STATES PATENT OFFICE.

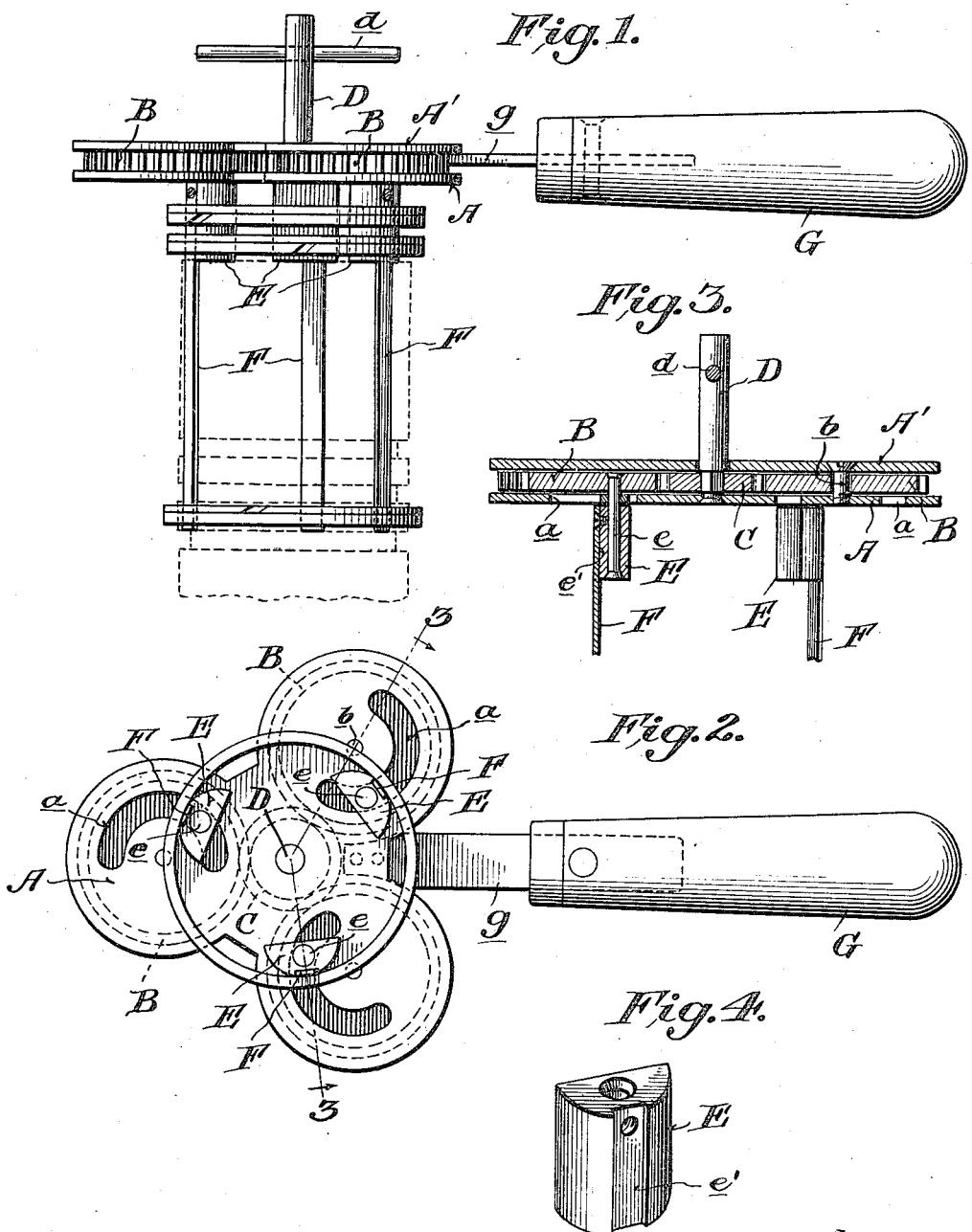

JAMES GANDEE, OF LANCASTER, PENNSYLVANIA, ASSIGNOR TO HENRY BRINSER KEIPER, OF LANCASTER, PENNSYLVANIA.

PISTON-RING PLACER.

1,262,036. Specification of Letters Patent. Patented Apr. 9, 1918.

Application filed October 13, 1917. Serial No. 196,543.

*To all whom it may concern:*

Be it known that I, JAMES GANDEE, a citizen of the United States, residing at Lancaster, in the county of Lancaster and State of Pennsylvania, have invented certain new and useful Improvements in Piston-Ring Placers; and I do hereby declare the following to be a full, clear, and exact description of the invention, such as will enable others skilled in the art to which it appertains to make and use the same.

This invention relates to machines or devices employed in assembling or placing piston packing rings in the grooves of pistons, and has for its object to provide a simple, inexpensive and efficient device for expanding the rings and placing them in the grooves without danger of distorting or breaking the rings by undue expansion, which results from the present practice of expanding and assembling piston rings and pistons by hand.

The invention will first be hereinafter more particularly described, with reference to the accompanying drawings, which form a part of this specification, and then pointed out in the claims at the end of the description.

In said drawings, Figure 1 represents a side elevation of a piston ring placer embodying my invention; a portion of the piston to which the device is applied being indicated by dotted lines;

Fig. 2 is an inverted or bottom plan view of the device;

Fig. 3 is a vertical sectional view, taken on the line 3—3 of Fig. 2, and

Fig. 4 is a detail perspective view of one of the spreader blocks detached.

Referring to said drawings, in which the same reference characters are used to denote corresponding parts in different views, the letters A and A¹ may denote metallic frame plates between which are placed at equal distances apart gear wheels B, preferably three, each of which is journaled upon a bolt or screw $b$, which is passed through an aperture in one of said plates and screwed into an opposed aperture in the other plate, so as to secure the two plates together with the gear wheels therebetween. The gear wheels B are adapted to engage an intermediate pinion C, which is secured to a shaft D, to which is secured a cross-bar or handle $d$, by which rotary motion may be imparted thereto and through the pinion C thereon to the gear wheels B, so as to cause said gear wheels to rotate in unison and all in the same direction. Each gear wheel carries a spreader arm $e$, on which is revolubly fitted a substantially semi-circular block E, said blocks being arranged concentric with the pinion C and adapted to be moved by rotation of the gear wheels laterally and radially or in an outward direction away from said pinion, for the purpose of expanding a piston ring placed over said blocks, as indicated in Figs. 1 and 2 of the drawings. The spreader arms $e$ protrude through arc-shaped slots $a$, in the frame plates A, along which they travel as the gears rotate. By the described arrangement, the expander blocks may be moved outwardly more easily and gradually and with greater leverage in effecting the expansion of the piston ring than if arranged to move along direct radial lines, and thus a too sudden or violent expansion of the piston ring, with consequent liability to distort or break the same, is prevented, as a very slight expansion of the ring is effected by a comparatively lengthy movement of the expanding devices, and such movement is accomplished without exerting much force or power, owing to the increased leverage due to the movement of the expander blocks simultaneously along both lateral and radial lines. The expander blocks are each preferably formed with a longitudinal depression or recess $e^1$, in which is secured by means of a set screw or other fastening device a flat or leaf spring F, said springs being adapted to overlap the end of the piston and provide a guideway along which the piston ring to be placed in the groove which is farthest removed from the end of the piston may be slid over and past the grooves which are nearer said end and snapped into the first named groove, whereupon the expanding device may be slightly raised, to bring the ends of the springs above the next groove in the series, and thereupon another piston ring may be slid over the piston and snapped into the next groove, and so on until all of the grooves are filled. The gear frame may be of any suitable construction, but is preferably of the clover-leaf form shown, and is provided with a suitable handle G, preferably a split wooden handle secured to a tang g, projecting from the frame plates between which it is secured.

It will be understood of course that various changes may be made in the form and arrangement of parts without departing from the spirit and scope of the appended claims. The leaf springs may be shortened or lengthened to suit pistons of different sizes having a greater or less number of grooves in which packing rings are to be placed, and a greater or less number of gear wheels with radially movable spreader arms may be employed, according to the desire of the maker and different requirements in practical use. Spreader blocks such as shown are preferably employed, capable of turning easily on the spreader arms to permit the placing of the piston ring around the same in different positions of said blocks.

Having thus described my invention, what I claim as new and desire to secure by Letters Patent of the United States is:

1. A piston ring placer comprising a frame having a handle, a shaft journaled in said frame carrying a pinion, a plurality of gear wheels meshing with said pinion, and spreader arms carried by said gear wheels, whereby a piston ring encircling said arms may be expanded by the rotation of said pinion.

2. A piston ring placer comprising a frame having a handle, a shaft journaled in said frame carrying a pinion, a plurality of gear wheels meshing with said pinion, and spreader arms carried by said gear wheels, concentric with said pinion and movable along lateral and radial lines by the rotation of said wheels, so as to gradually recede from the center and expand a piston ring placed around said arms.

3. A piston ring placer comprising a frame having a handle, a shaft journaled in said frame carrying a pinion, a plurality of gear wheels meshing with said pinion, and spreader arms carried by said gear wheels protruding through arc-shaped slots in said frame and movable in said slots along lateral and radial lines when said wheels are rotated, whereby a piston ring encircling said arms may be expanded by the rotation of said pinion and gear wheels.

4. A piston ring placer comprising frame plates having a handle secured thereto and gear wheels journaled therebetween, a pinion journaled in said frame intermediate said gear wheels and meshing therewith, spreader arms carried by said gear wheels each having a contact piece of block revolubly secured thereto, and springs secured to and projecting beyond each of said blocks parallel with said arms, whereby a piston ring placed around said blocks may be expanded and slid into a groove beyond the ends of said springs past other grooves underlying said springs.

5. A piston ring placer comprising frame plates of clover-leaf-like form secured together and having journaled therebetween a gear wheel in each leaf-like section, a centrally disposed pinion meshing with each of said gear wheels, a shaft journaled in said frame on which said pinion is fixed and having a handle for rotating the same, each of said leaf-like sections having an arc-shaped slot therein, spreader arms projecting from said gear wheels through said slots, and a revoluble spreader block carried by each of said arms together with a spring projecting beyond each block parallel with said arms.

6. In combination, a frame consisting of spaced metal plates of clover-leaf-life form secured together and having a gear wheel journaled therebetween in each leaf-like section thereof, a centrally disposed pinion meshing with said gear wheels, a handle projecting from said plates, a shaft carrying said pinion having a handle for rotating the same, spreader arms projecting from said gear wheels parallel with said shaft, and flat springs projecting from said spreader arms along which an expanded piston ring may be slid into a groove past other grooves in the piston underlying said springs.

In testimony whereof I affix my signature in the presence of two witnesses.

JAMES GANDEE.

Witnesses:
FRANK S. NEGLEY,
CHARLES F. SUMENT.

Copies of this patent may be obtained for five cents each, by addressing the "Commissioner of Patents, Washington, D. C."